Nov. 13, 1956  F. M. EXNER  2,770,768
SIGNAL GENERATING APPARATUS
Filed Dec. 29, 1952  2 Sheets-Sheet 1

INVENTOR.
FRANK M. EXNER
BY
George H. Fisher
ATTORNEY

Nov. 13, 1956  F. M. EXNER  2,770,768
SIGNAL GENERATING APPARATUS
Filed Dec. 29, 1952  2 Sheets-Sheet 2

INVENTOR.
FRANK M. EXNER
BY
George H Fisher
ATTORNEY

United States Patent Office 2,770,768
Patented Nov. 13, 1956

2,770,768

SIGNAL GENERATING APPARATUS

Frank M. Exner, Minneapolis, Minn., assignor to Minneapolis-Honeywell Regulator Company, Minneapolis, Minn., a corporation of Delaware Application December 29, 1952, Serial No. 328,487

15 Claims. (Cl. 323—51)

My invention relates to an electric signal generating apparatus and more particularly to improvements in position responsive signal generators or magnetic pick-ups of the constant air gap type with the purpose of eliminating or correcting for the phase shift and harmonic distortion between supply and output voltages such that these voltages are in phase and wave form agreement or alignment with one another throughout the entire range of output of the device and independent of frequency or amplitude variations in the exciting source.

At the present time the designs of variable inductance signal generating devices generally known as magnetic pick-ups have been such that it has not been possible to match the output signal voltage of the device exactly in phase and wave form with the voltage of the supply which is connected to the exciting winding of the apparatus.

Through suitable design of the magnetic circuit and selection of magnetic materials and electrical materials together with precise manufacture, it has been possible to produce magnetic pick-ups or signal generating devices having identical output to input characteristics from one unit to another and which further provide an output signal voltage whose phase and wave form remain constant while the signal amplitude varies over its working range. Such instruments may be used in systems or networks where the output of two or more devices are balanced against one another without regard for the phase displacement and difference in wave form which exists between the input and output voltage signals. However, when such devices are to be used in conjunction with A. C. potentiometers in networks where it is necessary to obtain a balance between the potentiometer and the signal generating device, some means must be employed to bring the two types of devices into phase and wave form agreement. One method of obtaining phase agreement is to shift the phase of the potentiometer signal by use of series capacitance. But when several potentiometers or resistance bridges are employed in a system this method may be impracticable. Furthermore it cannot correct for the wave form distortion resulting from unavoidable harmonics generated in the magnetic pick-ups. It is therefore the object of this invention to provide a means for correcting phase displacement and harmonic distortion in the output of a signal generating device so that the signal generator may be used in conjunction with potentiometer type signalling apparatus, with phase and wave form agreement between the signals of such devices.

It is further an object of this invention to provide in signal generating apparatus a phase correcting network including resistance and reactance means which introduces a supplementary voltage into the energizing circuit of the signal generator to provide for phase and wave form alignment of the output of the signal generating apparatus with the phase of the supplied power.

It is also an object of this invention to provide in a signal generating apparatus a phase and harmonic correcting network which corrects for phase displacement and harmonics originating in the electrical circuit and in the magnetic circuit of the signal generator.

Another object of this invention is to provide a phase correcting network in a signal generating apparatus which is effective to correct or align the output of the generator with the supply voltage independent of variation in frequency of the supply voltage.

These and other objects of this invention will become apparent from the reading of the attached description together with the drawings, wherein:

Figure 4 can further be applied in such a way as to correct harmonic distortion originating in the electrical circuit.

Figure 2:
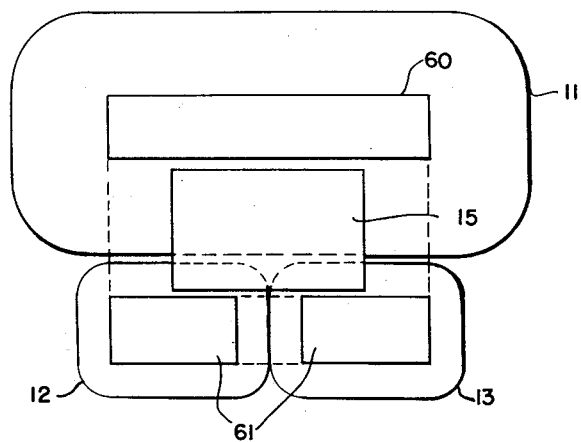
Figure 2 is a disclosure of one form of the constant air gap type of signal generating device or magnetic pick-up with which the invention is associated.

Signal generators or magnetic pick-ups are generally differentiated or classified according to their electrical and magnetic structure. For example, the signal generator may have a moving armature or portion of a core which moves to provide a variable air gap type of device in which the windings are positioned on the relatively stationary part of the structure. Still further, the magnetic structure may be such that the air gap within which the armature or iron moves is fixed and the windings are positioned on the stationary part of the structure such that displacement of the armature changes only the shape of the flux pattern but does not vary the overall reluctance of the magnetic circuit. Other types of magnetic pick-ups are of the moving coil variety in which one of the windings is placed on the fixed portion of the magnetic core structure and the other on the movable portion or in which only the winding or windings moves relative to the core structure. The amount of phase and harmonic distortion originating in the electrical and magnetic circuits of these various pick-ups will depend largely on the size and configuration of the air gap in relation to the magnetic core structure and on the resistance of the exciting winding. Variation of the amount of distortion with change in armature position is related to corresponding change in flux pattern and magnetic circuit reluctance. In the present disclosure, a constant air gap movable iron type of magnetic pick-up in which primary and secondary windings are mounted on the stationary portion of the core structure is utilized. This type of device falls under the classification of voltage output types of magnetic pick-up. The type of pick-up shown in Figure 2 is usually free of magnetic reaction force on the armature and because of the constant and small air gaps does not have exceedingly large phase shifts occurring therein.

Furthermore, the phase and the percentage harmonic distortion of the output signal is nearly constant as the signal amplitude varies with armature position.

To understand the way in which the present invention operates to correct phase and harmonic distortion it is necessary to appreciate the different ways in which such distortion may originate in voltage output type magnetic pick-ups. With sinusoidal excitation voltage the resistance drop assocated with the excitation current in the primary winding results in a phase displacement of the induced primary voltage relative to the exciting voltage. In the same way, because of the non-sinusoidal current wave required to excite the ferromagnetic core structure, some harmonic components are introduced into the primary induced voltage. The distortion process just mentioned will be hereinafter referred to as electrical circuit distortion. Additional phase and harmonic distortion of the output signal results from distortion, relative to the primary flux wave, of that portion of the flux which induces the signal E. M. F. in the secondary winding, this later distortion arising in the magnetic circuit. With a non-sinusoidal exciting voltage a further type of wave distortion results from the dependence on frequency of the electrical circuit phase distortion of the harmonic components of the exciting voltage. By providing correction of phase distortion for all frequencies, the present invention thereby incidentally corrects the last mentioned type of wave form distortion. The characteristics of the output circuit of the magnetic pick-up could also modify the wave form and phase relationship of the output signal. However it will readily be understood, that suitable adjustments may be made to the correcting network to correct for this aditional displacement should it occur.

Figure 1:
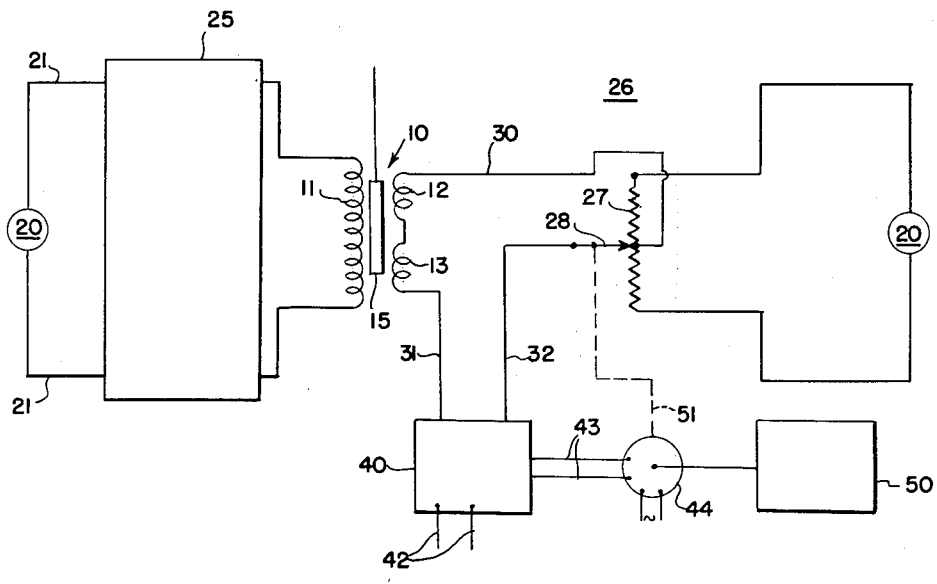
Figure 1 is a schematic circuit employing a magnetic pick-up or signal generating device in conjunction with an A. C. potentiometer in a motor control.

Figure 1 of the drawing shows a schematic circuit in which a magnetic pick-up or signal generator device is included in a follow-up arrangement with an A. C. potentiometer for controlling an electrical servomotor. The magnetic pick-up is shown schematically at 10 having a primary winding at 11 and a pair of opposed secondary windings 12 and 13 positioned in a mutual inductive relationship with the primary winding and coupled by means of an armature indicated at 15. The primary winding 11 of the pick-up 10 is energized through an alternating current source indicated at 20 through conductors 21, which lead to a phase and harmonic correcting network indicated by a block diagram 25 to which the primary winding is connected. The opposed secondary windings 12, 13 are series connected with an A. C. potentiometer indicated at 26 having a winding 27 and a wiper 28. The winding 27 of the potentiometer is energized from an alternating current source of power which would normally be the same as that energizing the magnetic pick-up and consequently is indicated at 20 on the sketch. One extremity of the series connected secondary windings of the magnetic pick-up is connected to a center tap of the winding 27 of the potentiometer 26 by a conductor 30 while the opposite extremity of the pair of serially connected secondary windings is connected by means of a conductor 31 to an amplifier indicated schematically in block form at 40. Similarly the wiper 28 of the potentiometer is connected to the amplifier 40 by a conductor 32. The amplifier would also have an A. C. energization such as is indicated by the conductors 42 leading to the A. C. source of power such as source 20 and the output of the amplifier indicated by the conductors 43 would energize the motor indicated schematically at 44, the rotation or output of which would operate on some load device indicated schematically in block form at 50. Movement of the rotating element of the motor would also operate to rebalance the A. C. potentiometer through a mechanical connection indicated by the dotted line at 51. In order that the output signal from the opposed secondary windings 12 and 13 be balanced by the potentiometer 26, it is necessary that phase and wave form agreement exist between the output of the magnetic pick-up 10 and the potentiometer 26.

The pick-up disclosed in the schematic circuit of Figure 1, which is used herein in disclosing the subject invention is shown in plan view in Figure 2. The magnetic core structure consists of a channel-shaped core member 60 one upstanding side of which is bifurcated as at 61. The primary energizing winding is wound on the upstanding portion which does not have a bifurcation and the secondary windings are wound respectively on the portions of the opposite upstanding bifurcations. The armature member 15 is positioned between the upstanding portions of the core structure above the windings 11, 12 and 13 and in a close proximity with the pole face surface of the core structure such that a very small air gap exists therebetween. Suitable means such as a shaft, not shown, are attached to the armature for moving the same longitudinally between the upstanding portions of the core structure such that the flux emanating from the portion of the core structure enclosed by the primary winding will be directed through the armature and to one or the other of the bifurcated portions of the core structure upon which the secondary windings are mounted.

Figure 3:
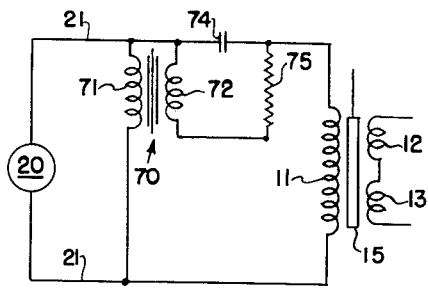
Figures 3 and 4 are disclosures of two energizing circuits of a magnetic pick-up or signal generator device employing phase correcting means for the phase displacement originating in the electrical circuit of the magnetic pick-up or signal generating device.
Figure 4:
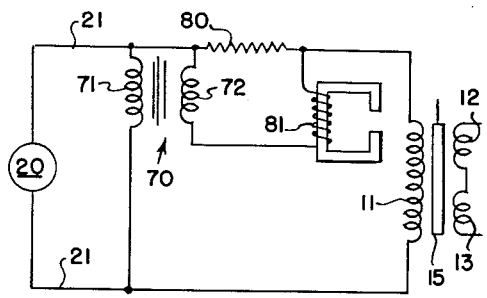
Figure 5:
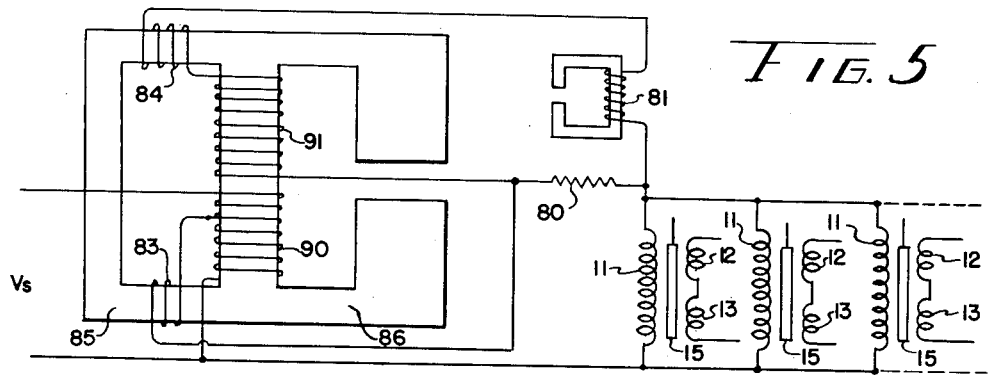
Figure 5 is a disclosure of an energizing circuit of a magnetic pick-up including means for correcting phase and harmonic distortion originating in the magnetic as well as the electric circuit of the magnetic pick-up of the subject invention and further illustrates the operation of a plurality of pick-ups from the same energizing circuit.

In Figure 1, the phase correcting network is shown merely as a block 25. The contents of the block diagram 25 when used for correcting phase displacement and harmonics in both the electrical and magnetic circuit of the magnetic pick-off is shown in Figure 5. Before describing the contents of the phase correcting network for both the electrical and magnetic portions of the magnetic pick-off in detail, reference will be made to that portion of the network designed to correct for the distortion originating in the electrical circuit. Reference is now made to Figures 3 and 4 wherein schematic circuits disclose two modifications of such correcting networks which provide for correction of the distortion in the electrical circuit only and which are operative independent of frequency variation and different harmonic frequencies in the exiting voltage.

When considering only the disturbances originating in the electrical circuit, and means for correcting the same, certain simplifying assumptions are required and in particular it must be assumed that the secondary or signal voltage output of the pick-up and the primary counter E. M. F. are induced by flux waves which are identical in phase and wave form. The differences which actually exist between the flux waves linking the primary and secondary originate in the magnetic circuit and a discussion of the corrections to be applied for this disturbance will be discussed later. Without going into complete detail as to how the phase displacement in the electrical circuit originates and what factors contribute to the same, it should be recognized that such phase displacement can be and is generally a measurable quantity and it can normally be attributed to the resistive component of the voltage drop in the primary winding. Improved performance can be obtained from correcting circuits consisting of passive networks of resistive and reactive components. Some such circuits are capable of adjustment to give exact phase correction but only for a single frequency. However, I have found that separately excited correcting circuits or networks can be adjusted to give phase corrections which vary with frequency in substantially the same way as the phase shift varies in the magnetic pick-up due to frequency variation. In Figure 3 a transformer indicated at 70 is connected across the alternating current source of supply 20 to provide a voltage opposite in phase to the supply voltage 20 as excitation for the correcting network. Transformer 70 has a primary 71 connected across the conductors 21 of the energizing circuit of the magnetic pick-up and a secondary winding 72, one extremity of which is connected in common with one of the conductors 21 connected to the primary winding 71 of the transformer. A condenser 74 is connected in series relationship with the primary winding 11 of the magnetic pick-up and in common to one extremity of the secondary winding 72 and primary winding 71 of the correcting transformer. The opposite extremity of the secondary winding is connected to a resistor 75 which in turn is connected to the extremity of the corrective condenser 74 common to the magnetic pick-up. It is clear that the voltage drops across 74 and 11 in series combine to equal the supply voltage from source 20. By proper choice of the values of resistance 75, capacitance 74 and voltage output of winding 72, the phase and amplitude of the voltage drop across 74 can be so adjusted as to bring the supply voltage into phase agreement with the induced voltage in pick-up winding 11, which has been assumed to be in phase with the output signal. It will be noticed that an undesired voltage drop across the correcting network is produced by the exciting current of the pick-up. To keep this unwanted voltage drop small the reactance of condenser 74 should be small. On the other hand, resistance 75 should be large compared to reactance 74 to give the desired phase relations in the correcting network. It may then be found that the separate exciting voltage of winding 72 should be larger than the voltage supply 20 by perhaps a factor of two in order to obtain a correcting voltage drop of proper amplitude across 74. Figure 4 discloses a similar circuit in which phase correction is provided by the voltage drop across the resistance 80, in which the current flowing from the reversed phase voltage source 72 is limited mainly by the reactor 81. By designing the reactor to have magnetic characteristics suitably related to those of the pick-up, this circuit can correct the harmonic as well as the phase distortion of the induced voltage in the pick-up primary. Since, however, harmonic distortion of electrical circuit origin is usually small, this advantage of the circuit of Figure 4 will be important chiefly in applications requiring unusually high resolution in balancing pick-up signals. In a pick-up of the type shown in Figure 2, it was found that the amount of third harmonic generated in the electrical circuit was only $\frac{1}{30}$ of that originating in the magnetic circuit.

Figure 6:
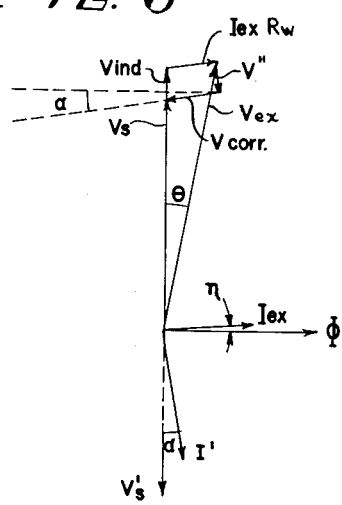
Figure 6 is a vector diagram explaining the correcting signals to be applied to the energizing winding of a magnetic pick-up to correct for phase displacement occurring in the electrical circuit of the magnetic pick-up shown in Figure 3.

The vector diagram of Figure 6, as noted above, is related to the correcting circuit of Figure 3. This latter circuit was chosen to disclose vectorially the effect or operation of the correcting network because of its simplicity inasmuch as no loss angles of correcting inductive reactance components are involved. It will be understood, however, that similar though more complex vector diagrams may be drawn to explain the operation of the correcting network of Figure 4. The vector diagram of Figure 6 is based on a specific magnetic pick-up design in which the inductive reactance of the pick-up exciting winding is approximately 2500 ohms; the D. C. resistance of the pick-up exciting winding is 450 ohms; phase displacement of primary induced voltage $V_{ind}$ introduced by these reactive and resistive components of the energizing winding relative to an excitation voltage $V_{ex}$ of 49 volts at 400 cycles is 10.3 degrees, which is known as the winding loss angle; the core loss angle for the pick-up is 2 degrees; the exciting current 0.018 ampere. The resistance 75 in Figure 3 is 1700 ohms and the 2 microfarad condenser 74 has 200 ohms reactance at the operating frequency of 400 cycles per second. Correcting circuit excitation voltage $V_s'$ of 86 volts in opposite phase to the supply voltage $V_s$ is supplied by transformer winding 72. To simplify the vector diagram Figure 6 the small component of current in the pick-up exciting winding resulting from the voltage $V_s'$ is neglected, together with the small component of the pick-up exciting current from source 20 which flows through resistance 75. Attention can now be focused on the series circuit through pick-up exciting winding 11, condenser 74 and source 20. Absorbing the source voltage $V_s$ in this circuit are the pick-up terminal voltage drop $V_{ex}$, an undesired voltage drop $V''$ produced by the pick-up exciting current $I_{ex}$ of 0.018 ampere in the 200 ohm reactance of condenser 74, and the correcting voltage drop $V_{corr}$ across condenser 74 due to the separately excited current $I'$. Having selected suitable values for $V_s'$ and capacitor 74 the value of resistance 75 can be adjusted experimentally to bring the resultant voltage $V_s$ into phase agreement with the induced component $V_{ind}$ of the pick-up voltage drop. The experimental vector diagram so obtained is found to differ only slightly from the simplified diagram of Figure 6.

It will be noticed that transformer 70 is actually an autotransformer. Other possible connection will be obvious, depending on the amplitude of the supply voltage compared to the exciting voltage required for the pick-up. Figure 5 shows in addition the correcting apparatus for the magnetic unbalance or phase displacement and harmonics originating in the magnetic circuit of the magnetic pick-up device. It further shows that the correcting network may be used when a plurality of exciting windings of magnetic pick-ups are connected in a parallel relationship. It should be however understood that if preferred each pick-up can be provided with its separate electric and magnetic distortion correcting means.

Considering now the magnetic circuit of the pick-off and the distortion occurring therein, it should be noted that this distortion can be observed by comparing the secondary output voltage with the induced voltage in a special test winding embedded in the primary winding of the magnetic pick-up. In pick-ups similar to the one shown in Figure 2, in which the total primary flux divides into fairly distinct parallel branches, the distortion of the flux wave linking the secondary can be largely explained as resulting from the different magnetizing characteristics of the different parallel flux paths. For example, in Figure 2 flux paths traversing the armature have a different proportion of iron to air than those leaking across the open spaces between legs 60 and 61 of the stator. The magentomotive force supplied by the exciting current will clearly produce fluxes having different wave forms in the different branch paths. The flux harmonics generated in this way cancel out when the branch fluxes rejoin to link the primary or when the branches link series aiding secondaries. In a pick-up, however, the secondaries are connected in series opposition in order to obtain a null signal with the armature centered. Therefore while the fundamental voltage components in the two secondaries subtract, the harmonics tend to add. Along with the higher harmonics, some first harmonic in quadrature to the main flux wave will be generated in the way just described. Hence the output signal voltage is found to be distorted in both phase and wave form relative to the primary induced E. M. F. It should be understood that with special search coils it is possible to observe stray flux which exhibits distortion not readily accounted for by the foregoing explanation based on simple parallel paths. However, this effect is of negligible importance in pick-ups with the general type of magnetic circuit configuration shown in Figure 2.

In a magnetic circuit of the type shown in Figure 2 all the flux paths except those traversing the armature contain such large air gaps that the iron part of the path has negligible influence on their magnetizing characteristic. The flux in these paths, therefore, has essentially the wave form of the exciting current, the latter being non-sinusoidal for sinusoidal exciting voltage. I have found that to correct the effect of flux wave distortion on the output signal of such a pick-up correcting voltages proportional to the time derivatives of each of the higher harmonic components of the exciting current, together with the quadrature first harmonic, should be added to the output signal voltage. Thus leg 85 of the core structure shown in Figure 1 has no air gap or a short gap (not shown) corresponding to the gap between the pick-up armature and stator, while the large gap in leg 86 simulates fringing and leakage paths. Winding 90 in Figure 5 may serve both as the energizing winding for the distortion correcting core structure and as an autotransformer for providing excitation for the pick-up. A separate energizing winding may be preferable if the winding loss angle is appreciable. Windings 83 and 84 serve to add to the excitation voltages provided by windings 90 and 91 additional voltages containing the harmonic components needed to correct for magnetic circuit distortion in the pick-ups as explained above. It will be noticed that in order to obtain the correcting components in proper phase, windings 83 and 84 are wound to buck windings 90 and 91 with respect to the fundamental. It will be understood however that the desired harmonics could be obtained from aiding windings on leg 86 instead of the bucking windings shown on leg 85, since as has been indicated above the two legs carry similar harmonica in opposite phase. However, the proper proportion of correcting components to fundamental is more easily obtained with bucking windings. A further advantage of bucking turns on the solid leg over aiding turns on the air gap leg is their lower leakage inductance. Actually a small amount of leakage inductance is not objectionable and is in some respects even beneficial to the functioning of the electrical circuit correcting networks.

It is clear that in place of the electrical circuit correcting means of Figure 4 which is shown in Figure 5 the means shown in Figure 3 could be employed. It will be noticed that for proper functioning of the magnetic circuit correcting means of Figure 5, electric circuit correction must also be provided, otherwise the harmonic components introduced into the pick-up inputs for magnetic distortion correction will appear in the output shifted in phase relative to the fundamental.

If a plurality of magnetic pick-ups in parallel excitation are substituted for the single pick-up in Figure 3 or Figure 4, it is evident that the undesired voltage drop (V" in Figure 6) across the series correcting impedance will be increased in proportion to the total pick-up exciting current. By reducing the values of both the resistance and the reactance of the correcting circuit in proportion to the number of pick-ups, the vector diagram is restored to its original proportions except that the exciting current for the correcting circuit is increased along with the pick-up current in proportion to the number of pick-ups.

It should be kept in mind that the present disclosure is intended to be illustrative only and that the electrical characteristics and the types of electrical impedance members used in the phase correcting network or their arrangement in the network to produce the correcting signal which is independent of frequency variation oscillation may vary with different types of magnetic pick-up devices. Consequently the subject invention should be limited only by the appended claims.

I claim as my invention:

1. In a signal producing apparatus of the induced voltage type, a magnetic core structure having an air gap therein and magnetic operating means positioned in said air gap and movable relative thereto, an energizing winding and an output winding mounted on said core structure, said output winding adapted to have a voltage induced therein in proportion to the movement of said magnetic operating means, an energizing circuit means connected to said energizing winding and adapted to be connected to an alternating current source of supply, and a correcting network means included in said energizing circuit means and adapted to correct for phase displacement originating in the energizing circuit means, the energizing winding and the magnetic core structure of said signal producing device to align the phase of the induced voltage in the output windings with the voltage of said source of supply.

2. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magnetic core structure of said signal producing device to align the phase of the induced voltage in the output windings with the voltage of said source of supply, said correcting network means including means for providing a voltage component of such phase relationship and magnitude in series with said energizing winding to produce an induced voltage in the output winding in phase with the supply voltage.

3. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magnetic core structure of said signal producing device to align the phase of the induced voltage in the output windings with the voltage of said source of supply, said correcting network being connected in series with said energizing winding and comprising two parallel branches, one branch being an impedance and the other an impedance in series with the secondary of a transformer used to separately excite the correcting network.

4. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, a correcting network means including a transformer having a magnetic circuit with a portion simulating the magnetic core structure of said signal producing device and having an output winding thereon and an impedance member connected to the output winding of said transformer with a second impedance member connected in parallel with said winding and said first named impedance, said correcting network being further connected in series with said energizing winding to correct for phase displacement originating in the energizing circuit means and said energizing winding and in the magnetic core structure of said signal producing device to align the phase of the induced voltage in the output winding with the voltage of said source of supply.

5. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, a correcting network means including a transformer having a magnetic circuit with a portion simulating the magnetic circuit of said signal producing device and having an output winding thereon with an impedance member connected to the output winding of said transformer and with a second impedance member connected in parallel with said winding and said first named impedance member, a pair of inductive means mounted on said magnetic circuit, one of which is connected in series with said second impedance and the other in series with said first impedance and said output winding, said correcting network being further connected in series with said energizing winding to correct for phase displacement and harmonic distortion originating in the energizing circuit means and said energizing winding and in the magnetic core structure of said signal producing device to align the phase and wave form of the induced voltage in the output winding with the voltage of said source of supply.

6. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, and a correcting network means including a transformer having a magnetic circuit with a portion simulating the magnetic circuit of said signal producing device and having primary and secondary windings thereon with a condenser connected to the output winding of the transformer and in series with a resistor, said condenser being further connected in series with said energizing winding of said signal producing apparatus across said alternating current source with said primary winding energized from said alternating current source to correct for phase displacement originating in the energizing circuit means and said energizing winding and in the magnetic core structure of said signal producing device to align the phase of the induced voltage in the output winding with the voltage of said source of supply.

7. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, a correcting network including a tapped transformer winding connected across said alternating current source and which is similar to the magnetic circuit of said signal producing device and with a pair of additional windings thereon, a first impedance device connected to one of said pairs of windings and energized from said tap of said transformer winding, a second impedance device connected in series with the other of said windings and a secondary winding of said transformer and in parallel with said first named impedance device, said first impedance being further connected in series with said energizing winding to correct for phase displacement originating in the energizing circuit means and said energizing winding and in the magnetic core structure of said signal producing device to align the phase of the induced voltage in the output winding with the voltage of said source of supply.

8. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, and a correcting network means included in said energizing circuit means and adapted to correct for phase displacement and wave distortion originating in the energizing circuit means, the energizing winding and the magnetic core structure of said signal producing device, to align the phase and wave form of the induced voltage in the output windings with the voltage of said source of supply.

9. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magetic core structure of said signal producing device to align the phase and wave form of the induced voltage in the output windings with the voltage of said source of supply, said correcting network means including means for providing a voltage component of proper phase and wave form and of such magnitude connected in series with said energizing winding to be added to the excitation voltage of said winding to produce an induced voltage in the output of said apparatus in phase and wave form agreement with the supply voltage.

10. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magnetic core structure of said signal producing device to align the phase of the induced voltage in the output windings with the voltage of said source of supply, said correcting network means including means for providing a voltage component of opposite phase and of such magnitude connected in series with said energizing winding to be added to the excitation voltage of said winding to produce an induced voltage in the output of said apparatus in phase with the supply voltage, and further inductive means included in said connecting network and connected in series with said first named voltage providing means for producing additional correcting voltage containing harmonic components which balance out harmonic components in the induced output voltage caused by magnetic circuit distortions.

11. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magnetic core structure of said signal producing device to align the phase of the induced voltage in the output windings with the voltage of said source of supply, said correcting network including a transformer having a magnetic circuit similar to the magnetic core structure of said signal producing device with a primary winding connected across the alternating current supply and a secondary winding connected to and energizing a first impedance with a second phase shifting impedance connected in series therewith, the secondary winding and said first and second impedances being included in the energizing circuit of said energizing winding.

12. In a signal producing apparatus of the induced voltage type, a magnetic core structure having an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of supply, a correcting network means included in said energizing circuit means to correct for phase displacement originating in the energizing circuit means, the energizing winding and the magnetic core structure of said signal producing device to align the phase of the induced voltage in the output windings with the voltage of said source of supply, said correcting network including a transformer having a magnetic circuit similar to the magnetic core structure of said signal producing device with a primary winding connected across the alternating current supply and a secondary winding connected to and energizing a first impedance with a second phase shifting impedance connected in series therewith, the secondary winding and said first and second impedances being connected in series with the energizing circuit of said energizing winding.

13. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, and a correcting network means including a transformer having a magnetic circuit with a portion simulating the magnetic circuit of said signal producing device and having primary and secondary windings thereon with a resistor connected to the output winding of the transformer and in series with a reactor, said resistor being further connected in series with said energizing windings of said signal producing apparatus across said alternating current source with said primary winding energized from said alternating current source to correct for phase displacement originating in the energizing circuit means and said energizing winding and in the magnetic core structure of said signal producing device to align the phase of the induced voltage in the output winding with the voltage of said source of supply.

14. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, and a correcting network means including a transformer having a magnetic circuit with a portion simulating the magnetic circuit of said signal producing device and having primary and secondary windings thereon with a resistor connected to the output winding of the transformer and in series with a reactor, said resistor being further connected in series with said energizing windings of said signal producing apparatus across said alternating current source with said primary winding energized from said alternating current source to correct for phase displacement originating in the energizing circuit means and said energizing winding and in the magnetic core structure of said signal producing device to align the phase of the induced voltage in the output winding with the voltage of said source of supply, and further inductive means included in said connecting network and mounted on said magnetic circuit of said transformer and connected in series with said resistor for correcting for harmonic distortion present in the induced voltage of said output winding of said signal producing apparatus.

15. In a signal producing apparatus of the induced voltage type, a magnetic core structure with an air gap therein and magnetic operating means positioned in said air gap and movable relative thereto, an energizing winding and an output winding mounted on said core structure, said output winding being adapted to have a voltage induced therein in proportion to the movement of said magnetic operating means, an energizing circuit means connected to said energizing winding and adapted to be connected to an alternating current source of power, and a correcting network means including a transformer having a magnetic circuit with a portion simulating the magnetic circuit of said signal producing device and having primary and secondary windings thereon with a resistor connected to the output winding of the transformer and in series with a reactor, said resistor being further connected in series with said energizing windings of said signal producing apparatus across said alternating current source with said primary winding energized from said alternating current source to correct for phase displacement originating in the energizing circuit means and said energizing winding and in the magnetic core structure of said signal producing device to align the phase of the induced voltage in the output winding with the voltage of said source of supply, and further inductive means included in said connecting network and mounted on said magnetic circuit of said transformer comprising a pair of windings, one of which is connected in series with said transformer secondary and said reactor and the other is connected in series with said resistor for correcting for harmonic distortion present in the induced voltage of said output winding of said signal producing apparatus.

References Cited in the file of this patent

UNITED STATES PATENTS

| | | |
|---|---|---|
| 2,439,891 | Hornfeck | Apr. 20, 1948 |
| 2,511,564 | Callan | June 13, 1950 |
| 2,615,936 | Glass | Oct. 28, 1952 |